United States Patent [19]

Bevis

[11] Patent Number: 5,325,657
[45] Date of Patent: Jul. 5, 1994

[54] DEBRIS GUIDING DEVICE FOR A LAWN MOWER

[76] Inventor: Russell R. Bevis, 1303 Live Oak Plantation Rd., Tallahassee, Fla. 32312

[21] Appl. No.: 921,734

[22] Filed: Jul. 30, 1992

[51] Int. Cl.⁵ .................................................. A01D 34/68
[52] U.S. Cl. ................................. 56/320.1; 56/DIG. 24
[58] Field of Search ................... 56/320.1, 320.2, 17.4, 56/DIG. 20, DIG. 24

[56] References Cited

U.S. PATENT DOCUMENTS 2,942,396  6/1960  Farnam ........................ 56/320.2 X
2,972,849  2/1961  Ridenour et al. .................. 56/320.2
2,992,524  7/1961  Stabnau ........................... 56/320.1
4,189,904  2/1980  Paker ........................... 56/320.2 X Primary Examiner—Terry Lee Melius
Attorney, Agent, or Firm—Michael I. Kroll

[57] ABSTRACT

A debris guiding device is provided for a lawn mower of the type having a deck, an engine supported on the deck, wheels, a handle and a grass catcher bag. The debris guiding device contains a structure located at a front portion of the deck for directing lawn debris directly under the front portion of the deck. The lawn debris will be lifted, cut and sucked into the grass catcher bag, when a person gripping the handle pushes the lawn mower along to cut grass by operation of the engine.

5 Claims, 3 Drawing Sheets

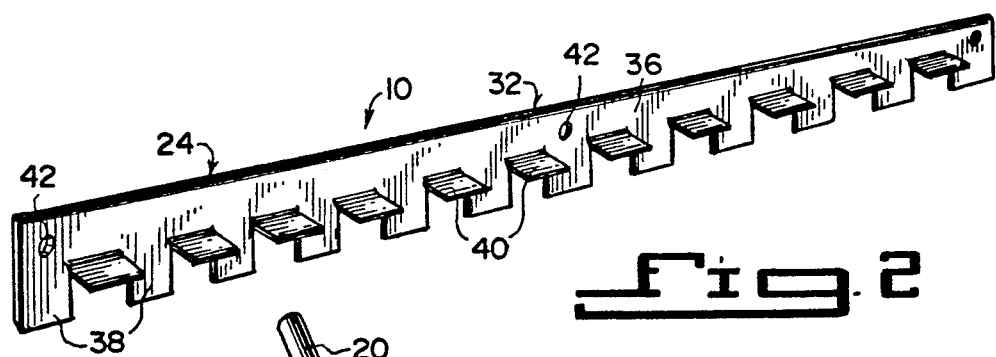
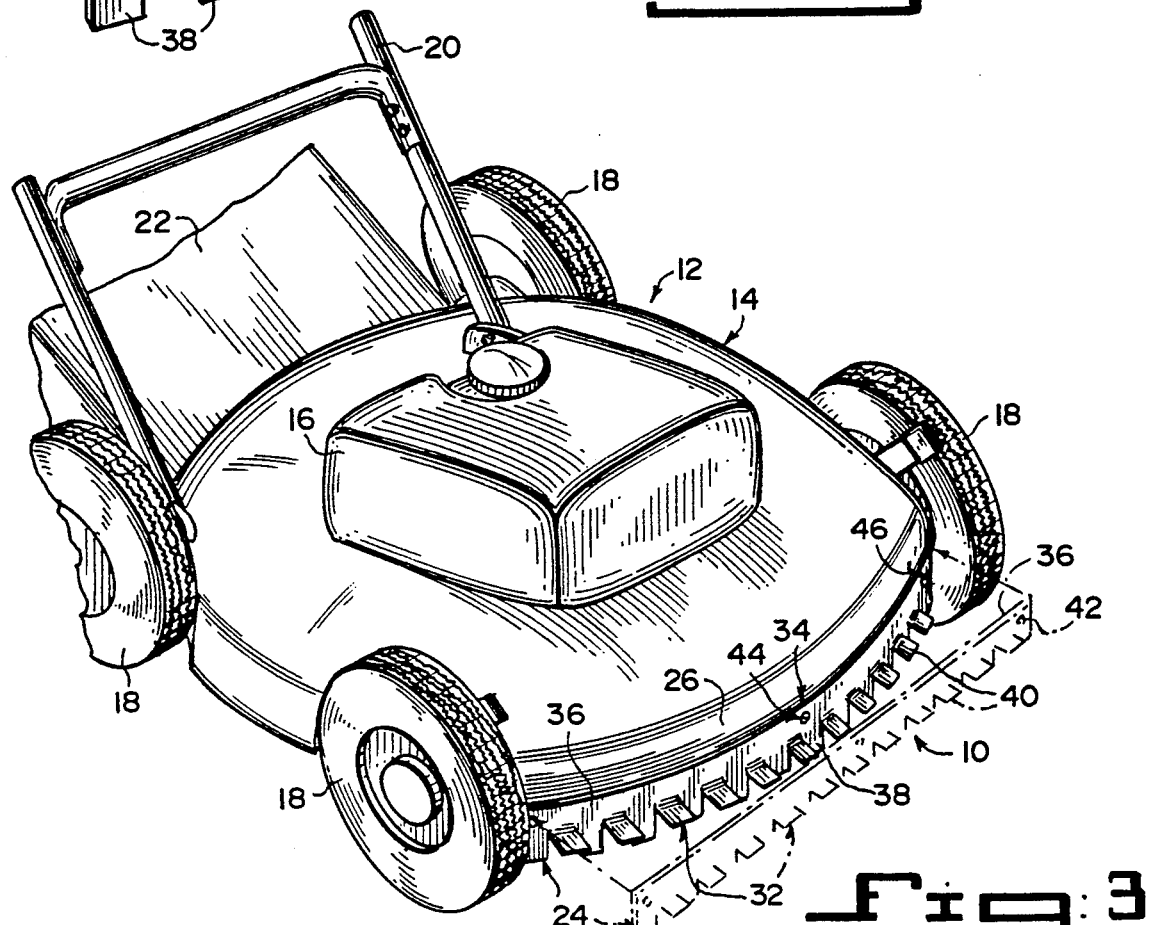
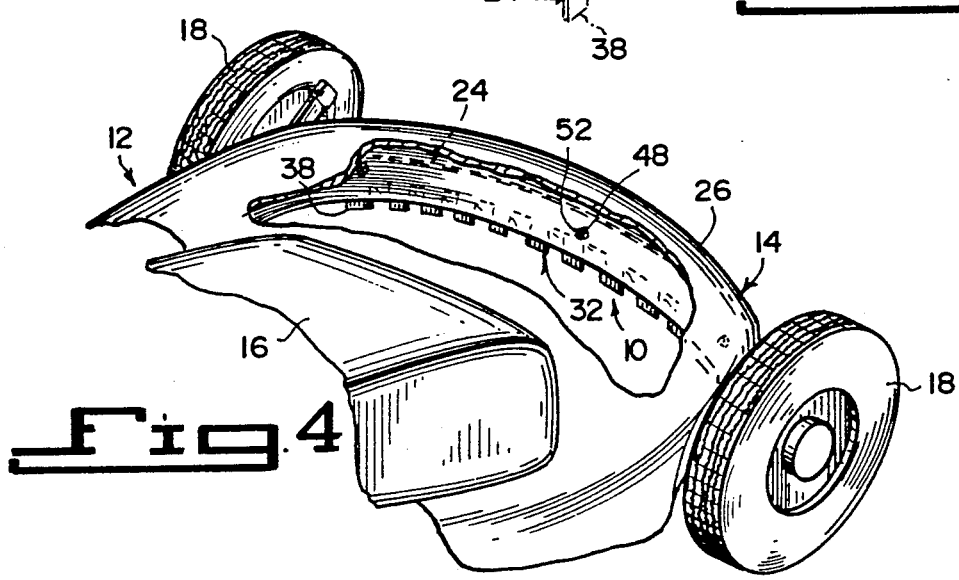

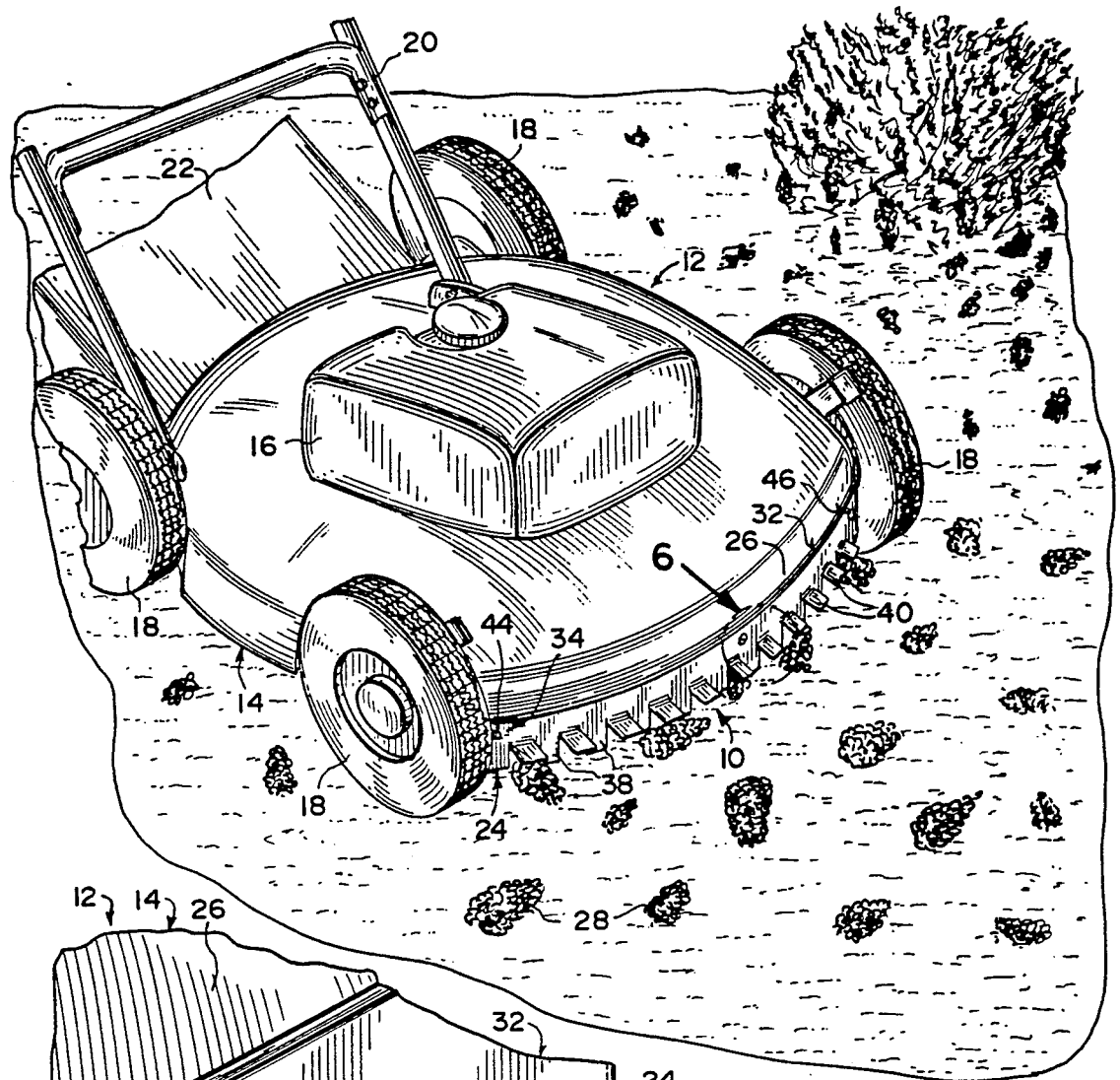
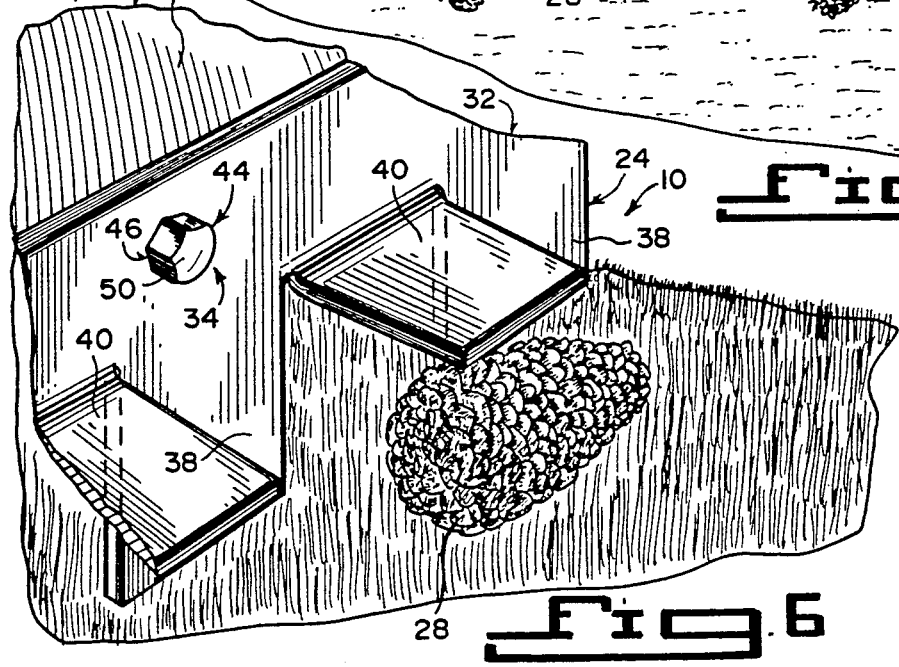

DEBRIS GUIDING DEVICE FOR A LAWN MOWER

BACKGROUND OF THE INVENTION

The instant invention is the subject matter of Disclosure Document No.: 307022, filed in the PTO on Apr. 30, 1992, and it is respectfully requested that this document be retained beyond the two-year period, so that it may be relied upon as evidence of conception of the invention during the prosecution phase of this application, should the need arise.

FIELD OF THE INVENTION

The instant invention relates generally to lawn mower attachments and more specifically it relates to a debris guiding device for a lawn mower, which may be any type of lawn mower including, but not limited to a riding lawn mower, a self propelled power mower and/or a power mower that is manually pushed.

DESCRIPTION OF THE PRIOR ART

Numerous lawn mower attachments have been provided in prior art that are adapted to be used in conjunction with lawn mowers to perform various tasks when the lawn mowers are cutting grass. While these units may be suitable for the particular purpose to which they address, they would not be as suitable for the purposes of the present invention as heretofore described.

SUMMARY OF THE INVENTION

A primary object of the present invention is to provide a debris guiding device for a lawn mower, that will overcome the shortcomings of the prior art devices.

Another object is to provide a debris guiding device for a lawn mower, that will allow a lawn mower to cut grass at a desired height, while at the same time will remove pine cones, sticks and other small objects from the lawn thereby leaving a clean cut lawn.

An additional object is to provide a debris guiding device for a lawn mower, which is mounted to a front portion of a deck of the lawn mower, so that the pine cones, sticks and other small objects will be forced directly under the deck to be lifted, cut and sucked into a grass catcher bag.

A further object is to provide a debris guiding device for a lawn mower, that is simple and easy to use.

A still further object is to provide a debris guiding device for a lawn mower, that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 2 is a perspective view of the instant invention per se before installation to the front portion of the deck of the lawn mower.

FIG. 3 is a front perspective view of the lawn mower with parts broken away showing how the instant invention is installed thereto.

FIG. 4 is a rear perspective view of the lawn mower with parts broken away with the instant invention installed thereto.

FIG. 5 is a front perspective view similar to FIG. 3 showing pine cones on the lawn being guided through the teeth.

FIG. 6 is an enlarged front perspective view as indicated by arrow 6 in FIG. 5 showing the teeth in greater detail.

DETAILED DESCRIPTION OF THE PREFERRED EMBODIMENTS

Figure 1:
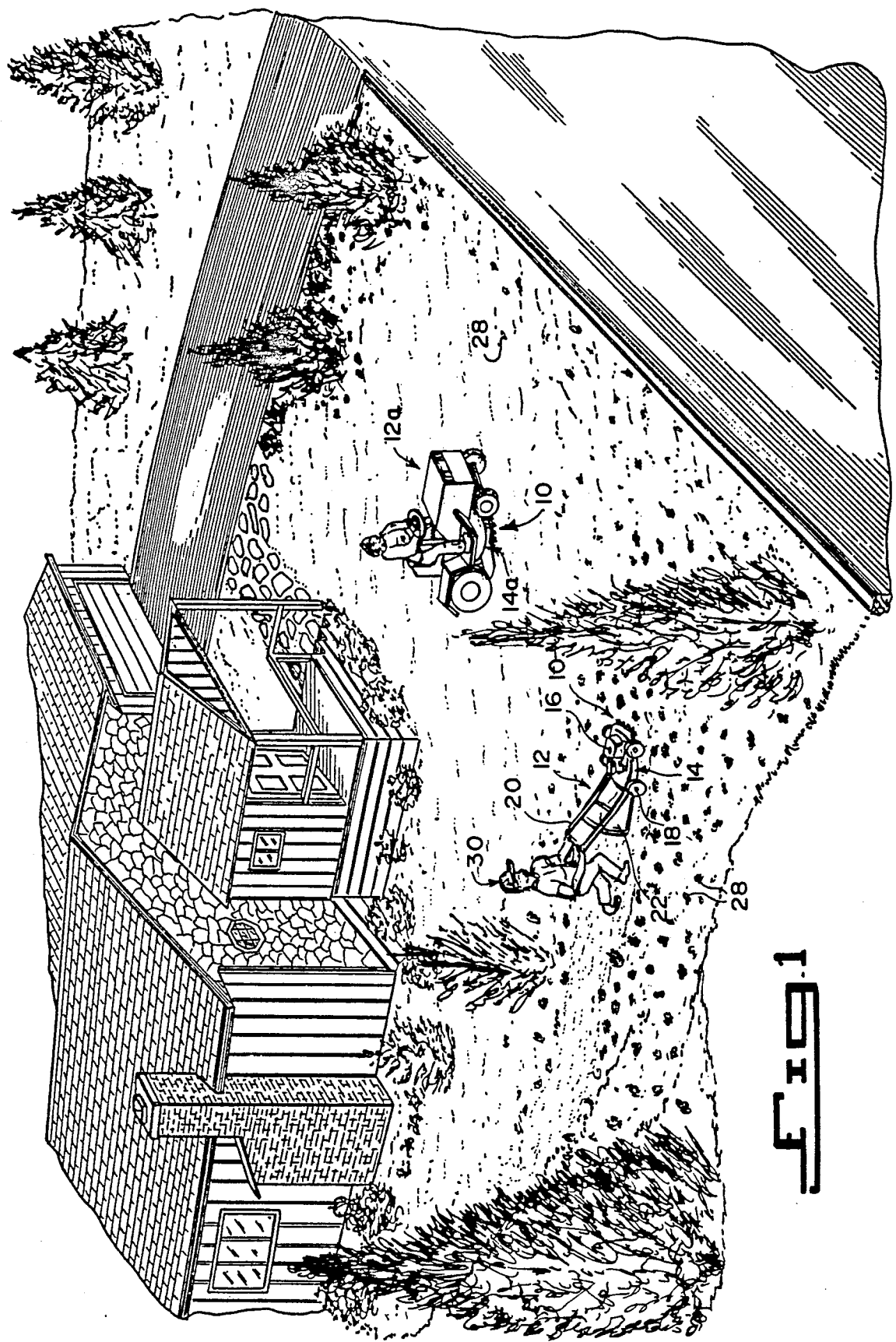
FIG. 1 is a perspective view of a lawn showing the instant invention in conjunction with a manually pushed lawn mower and a riding lawn mower, both used in cutting the grass and removing debris therefrom.

Turning now descriptively to the drawings, in which similar reference characters denote similar elements throughout the several views, the Figures illustrate a debris guiding device 10 for a lawn mower 12 of the type having a deck 14, an engine 16 supported on the deck 14, wheels 18, a handle 20 and a grass catcher bag 22. The debris guiding device 10 contains a structure 24 located at a front portion 26 of the deck 14 for directing lawn debris 28, such as pine cones, sticks, and other small objects, directly under the front portion 26 of the deck 14. The lawn debris 28 will be lifted, cut and sucked into the grass catcher bag 22, when a person 30 griping the handle 20 pushes or rides the lawn mower 12 along to cut grass by operation of the engine 16.

The directing structure 24 consists of an elongated flexible comb-like implement 32 and a mechanism 34 for securing the implement 32 to the front portion 26 of the deck 14 of the lawn mower 12. Any lawn debris 28 making contact with the implement 32 will be placed directly under the front portion 26 of the deck 14.

The elongated flexible comb-like implement 32 includes a flat spine 36, which can be flexed to fit against the front portion 26 of the deck 14. A first set of flat teeth 38 are spaced apart and extend vertically from the flat spine 36 to help guide the lawn debris 28 to go directly under the front portion 26 of the deck 14. The elongated flexible comb-like implement 32 further includes a second set of flat teeth 40 spaced apart with each located one after another between each of the second set of flat teeth 38 and extends at about a forty five degree angle from the flat spine 36 to additionally help guide the lawn debris 38 to go directly under the deck 14.

The securing mechanism 34 contains the flat spine 36 having a plurality of holes 42 therethrough. A plurality of fasteners 44 are provided, each of which extends through one of the holes 42 in the flat spine 36 and into the front portion 26 of the deck 14 of the lawn mower 12. Each fastener 44 is a bolt 46 having a threaded shank 48 and a hex head 50. Each fastener 44 further includes a hex nut 52 threadably onto a free end of the threaded shank 48 of the bolt 46. The elongated flexible comb-like implement 32 can be fabricated out of a piece of sixteen gauge steel measuring generally, but not limited to, two inches in width by twenty two inches in length. Other types of materials can be used such as synthetics, while different widths and lengths may be required for different sized lawn mowers 12.

To construct the debris guiding device 10 for the lawn mower 12, the following steps should be taken:

1. Cut a sheet of durable material into a rectangular piece having two short edges and two long edges.
2. Mark on one side of the rectangular piece a center line from one short edge to other short edge.
3. Draw a plurality of equally spaced apart transverse lines from the center line to one long edge.
4. Cut through each of the transverse lines to form a plurality of flat teeth extending therefrom.
5. Bend every other tooth starting with a second tooth at an angle of about forty five degrees, so that every straight tooth will be one of the first set of flat teeth 38 and every bent tooth will be one of the second set of flat teeth 40. The upper portion will be the flat spine 36 of the flexible comb-like implement 32.

To install the debris guiding device 10 to the lawn mower 12 the following steps should be taken:
1. Punch a plurality of spaced apart holes 42 through the flat spine 36 of the flexible comb-like implement 32.
2. Drill a plurality of apertures through the front portion 26 of the deck 14 of the lawn mower 12, which are in alignment with the holes 42 in the flat spine 36.
3. Apply a fastener 44 through each hole 42 in the flat spine 36 and into each aligned aperture in the front portion 26 of the deck 14 to secure the flexible comb-like implement 32 to the front portion 26 of the deck 14.

The lawn mower 12, as shown in the drawings and described above, is a power mower that is manually pushed. Other types of lawn mowers can also be used with the debris guiding device 10, such as a riding lawn mower 12a, shown in FIG. 1 and a self propelled power mower (not shown).

The riding lawn mower 12a, may best utilize the debris guiding device 10. The deck 14a is adjustable up and down on a stationary frame. The deck 14a is moved into a lowered position and is heavy enough to crush the lawn debris 28 downward. The holes 42 are replaced by slots to allow adjustment up and down of the comb-like implement 32, with the deck to accommodate larger or smaller types of lawn debris 28 and still cut the grass at a desired height.

The debris guiding device 10 can be prefabricated into the mold of the deck 14 itself, instead of being made as a separate member. This will eliminate the need to drill the holes 42 in the flat spine 36 and the aligned apertures in the front portion 26 of the deck 14. The fasteners 44 are now not needed for securing the comb-like implement 32 to the front portion 26 of the deck 14.

LIST OF REFERENCE NUMBERS

10: debris guiding device
12: lawn mower
12a: rider lawn mower
14: deck of 12
14a: deck of 12a
16: engine on 14
18: wheels on 14
20: handle on 14
22: grass catcher bag for 12
24: directing structure
26: front portion of 14
28: lawn debris
30: person
32: elongated flexible comb-like implement
34: securing mechanism
36: flat spine
38: first flat tooth
40: second flat tooth
42: hole in 36
44: fastener
46: bolt for 44
48: threaded shank of 46
50: hex head on 48
52: hex nut It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A debris guiding device for a lawn mower of the type having a deck, an engine supported on the deck, wheels attached to the deck and contacting the ground, a handle attached to the deck, and a grass catcher bag attached to the deck, said debris guiding device comprising
    an elongated, flexible, comb-like implement located at a front portion of the lawn mower deck for directing lawn debris directly under the front portion of the deck, whereby lawn debris is subsequently lifted, cut, and discharged into the grass catcher bag when a person gripping the handle pushes the lawn mower with the lawn mower engine running, said implement further comprising
    a flat spine which can be flexed to fit against the front portion of the lawn mower deck,
    a first set of flat teeth spaced apart and extending vertically from said flat spine, and
    a second set of flat teeth spaced apart with each located one after another between each of said first set of flat teeth, and extending at about a forty-five degree angle from said flat spine; and
    means for securing said implement to the front portion of the deck of the lawn mower.

2. A debris guiding device for a lawn mower as recited in claim 1, wherein said securing means includes:
    a) said flat spine having a plurality of holes therethrough; and
    b) a plurality of fasteners, each of which extends through one of said holes in said flat spine and into the front portion of the deck of the lawn mower.

3. A debris guiding device for a lawn mower as recited in claim 2, wherein each said fastener is a bolt having a threaded shank and a hex head.

4. A debris guiding device for a lawn mower as recited in claim 3, wherein each said fastener further includes a hex nut threadably onto a free end of said threaded shank of said bolt.

5. A debris guiding device for a lawn mower as recited in claim 4, wherein said elongated flexible comb-like implement can be fabricated out of a piece of sixteen gauge steel measuring generally, but not limited to two inches in width by twenty two inches in length.

* * * * *